United States Patent
Fuller (10) Patent No.: US 9,380,411 B2
(45) Date of Patent: Jun. 28, 2016

(54) PROXIMITY DETECTION

(75) Inventor: Richard Fuller, Morgan Hill, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

(21) Appl. No.: 13/529,266

(22) Filed: Jun. 21, 2012

(65) Prior Publication Data

US 2013/0343364 A1 Dec. 26, 2013

(51) Int. Cl.
| | |
|---|---|
| H04W 48/18 | (2009.01) |
| H04W 48/14 | (2009.01) |
| H04W 64/00 | (2009.01) |
| H04W 84/12 | (2009.01) |
| H04W 4/02 | (2009.01) |
| H04L 29/06 | (2006.01) |
| H04L 29/12 | (2006.01) |

(52) U.S. Cl.
CPC ............ *H04W 4/02* (2013.01); *H04L 63/1466* (2013.01); *H04L 69/22* (2013.01); *H04L 61/1588* (2013.01); *H04L 61/609* (2013.01); *H04L 61/6022* (2013.01); *H04W 48/14* (2013.01); *H04W 84/12* (2013.01)

(58) Field of Classification Search
CPC ....... H04W 48/14; H04W 84/12; H04W 4/02; H04W 12/00; H04L 61/6022; H04L 69/22; H04L 63/1466

USPC ........ 370/338; 455/436, 437, 434, 435.1, 440
See application file for complete search history.

(56) References Cited

U.S. PATENT DOCUMENTS

| | | | | |
|---|---|---|---|---|
| 7,184,777 | B2* | 2/2007 | Diener et al. | 455/456.1 |
| 7,230,920 | B1* | 6/2007 | Stratigakis | 370/230 |
| 7,236,798 | B2* | 6/2007 | Beuck | 455/456.1 |
| 7,457,620 | B2* | 11/2008 | Lam et al. | 455/434 |
| 8,031,657 | B2* | 10/2011 | Jones et al. | 370/328 |
| 2004/0198392 | A1* | 10/2004 | Harvey et al. | 455/456.1 |
| 2004/0202132 | A1* | 10/2004 | Heinonen et al. | 370/331 |
| 2006/0073840 | A1* | 4/2006 | Akgun et al. | 455/456.3 |
| 2006/0111103 | A1* | 5/2006 | Jeong et al. | 455/434 |
| 2007/0047492 | A1* | 3/2007 | Kim et al. | 370/331 |

OTHER PUBLICATIONS

NCHU.edu, 802.11 Framing in Detail, Feb. 27, 2004, pp. 1-48.*

* cited by examiner

*Primary Examiner* — Andrew Lai
*Assistant Examiner* — Albert Shih
(74) *Attorney, Agent, or Firm* — Oblon, McClelland, Maier & Neustadt, L.L.P.

(57) ABSTRACT

Disclosed are various embodiments of a wireless access point. An 802.11 probe request frame is obtained from a wireless device in a wireless access point. Identifying information about the wireless device is extracted from the 802.11 probe request frame. The identifying information and an access point identifier corresponding to the wireless access point to at least one server via a network, from which location and/or proximity to the wireless access point can be determined.

20 Claims, 7 Drawing Sheets

PROXIMITY DETECTION

BACKGROUND

Many different types of technologies exist for location detection of a wireless device for authentication or other purposes. One example is the Global Positioning System (GPS) or other types of special purpose global location systems, which requires computing and power resources of the wireless device. Other examples are network location methods based upon an internet protocol (IP) address of the wireless device, which may only be feasible when the wireless device has been issued an IP address that is known to the system attempting to locate the device. Other types of systems and methods may require special purpose hardware and/or software implemented in the wireless device itself.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure relates systems and methods that facilitate determining proximity of wireless devices based upon a location of wireless access points in communication with the wireless devices. As noted above, IEEE 802.11 standards and/or proposals are often employed to facilitate communication between a wireless network access point and client devices. The differing variants of 802.11 networking technology provide the ability for a wireless device to discover available wireless networks facilitated by nearby wireless access points by transmitting a probe request frame as defined by 802.11. Accordingly, embodiments of the disclosure can extract identifying information from such a probe request when a wireless device is in the vicinity of a wireless access point and associate the wireless device with a particular location.

In this way, the location or proximity of a wireless device can be detected using 802.11 standards without modifying the underlying firmware and/or hardware capabilities of the wireless device. In other words, in an embodiment of the disclosure, the wireless device need not have any specialized capabilities or transmit any specialized messaging in order for its proximity to a particular resource and/or geographic location to be determined. Additionally, one or more proximity servers can be in communication with many wireless access points equipped to provide information about a wireless device to facilitate security applications, location based marketing applications, or any application in which a location of a wireless device can be used.

Figure 1:
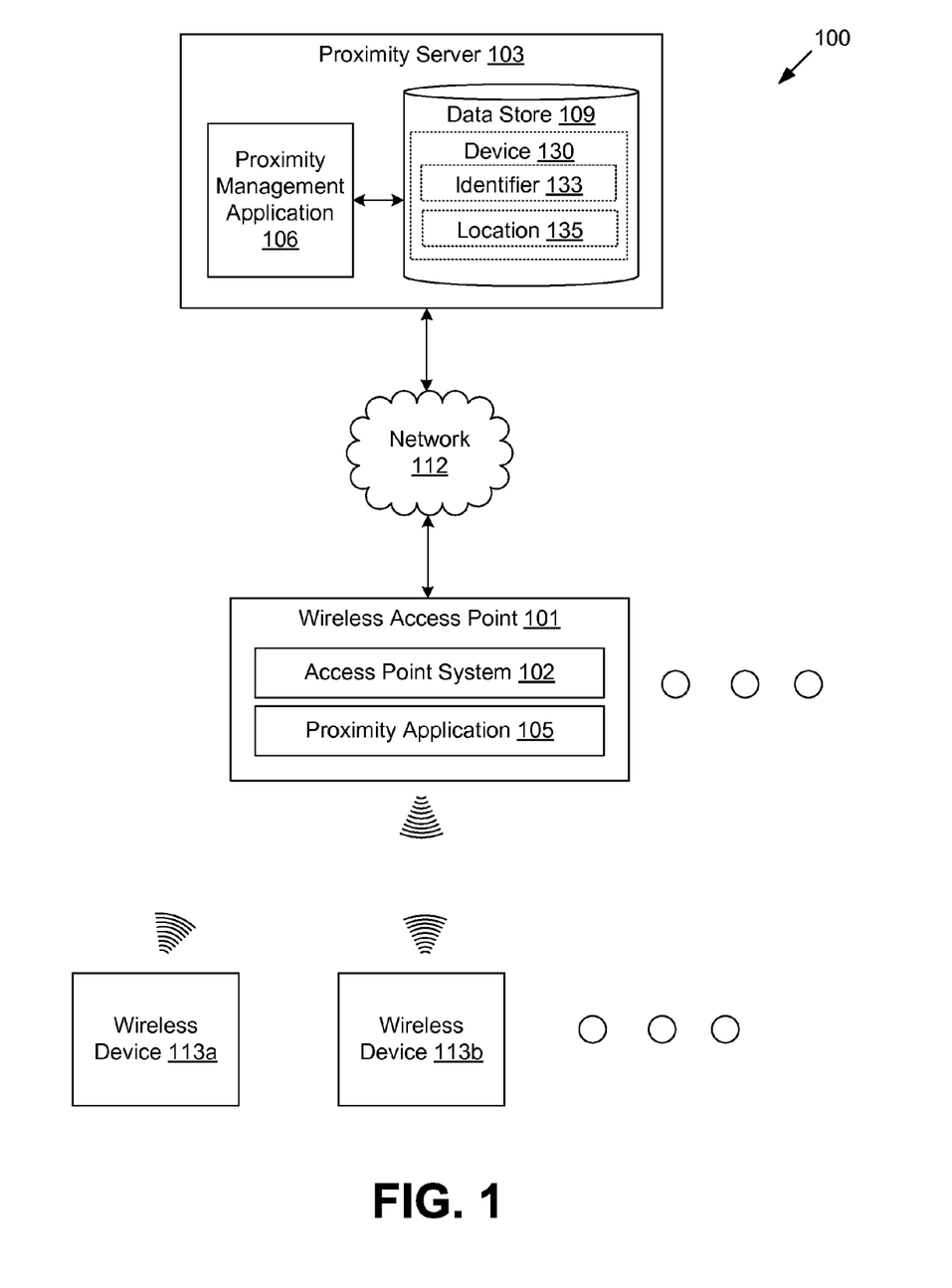
FIG. 1 is a drawing of a networked environment including a wireless access point executing proximity application according to various embodiments of the disclosure.

With reference to FIG. 1, shown is one example a networked environment 100 in which an embodiment of the disclosure can be implemented. The networked environment 100 includes a wireless access point 101 as well as potentially proximity server 103 in communication with one or more networks 112. The network 112 includes, for example, the Internet, intranets, extranets, wide area networks (WANs), local area networks (LANs), wired networks, wireless networks, or other suitable networks, etc., or any combination of two or more such networks.

The wireless access point 101 can comprise a dedicated wireless local area network access point in some embodiments. In other embodiments, the wireless access point 101 can represent a hotspot device, a smartphone including hotspot functionality, mobile access point, or any other equivalent device that provides wireless access point functionality. Additionally, a vehicular or aircraft based wireless access point can also implement the functionality described herein. In some embodiments, the wireless access point 101 can facilitate a publicly accessible wireless network, such as in an airport, coffee shop, or the like. The wireless access point 101 provides access to the network 112 using one or more IEEE 802.11 standards, drafts, and/or proposals and therefore supports the messaging and frame types defined by these various 802.11 protocols.

Therefore, the wireless access point 101 can include an access point system 102, proximity application 105, and/or other data. The access point 101 can provide access to a wireless network for various client devices, or wireless devices 113, with which it is communicating. In some cases, wireless access point 101 can include integrated routing functionality. In other cases, the wireless access point 101 merely couples the client devices to a wired or other network without including routing functionality. The wireless access point 101 can also relay data between various wireless devices 113 that are on the wireless network facilitated by the access point 101. The access point system 102 can represent one or more applications, services, and/or processes that interact with various hardware components in the wireless access point 101, such as a wireless local area network controller, antenna systems, baseband processors, etc., to implement routing functionality, firewall functionality, network address translation (NAT) functionality, and/or other functionality The proximity application 105 is executed by the wireless access point 101 to proximity or location detection of wireless devices 113 as described herein. Additionally, in some embodiments, the wireless access point 101 can be configured with hardware, firmware, and/or software capabilities that facilitate determination of a location of the wireless access point 101. For example, the wireless access point 101 can be configured with a global navigation satellite system (GNSS) chipset that communicates with a GNSS system, e.g., global positioning system (GPS), Globalnaya Navigatsionnaya Sputnikovaya Sistema (GLONASS), Indian Regional Navigational Satellite System (IRNSS), Galileo, etc. In other embodiments, the proximity application 105 can be configured with capabilities to determine a rough location based upon internet protocol (IP) address location finding algorithms. In other embodiments, the wireless access point 101 can simply be configured with an indication of its physical location. In yet another example, a location of the wireless access point 101 can be maintained elsewhere based upon an access point identifier, such as a MAC address or other identifying information. It should be appreciated that the proximity application 105 can also be implemented in firmware executable by a processor circuit as well as digital logic circuitry and that the depicted implementation is but one example.

The wireless access point 101 can also be in communication with one or more wireless devices 113, which may access the network 112 via the wireless access point 101. Any of these wireless devices 113 is representative of a plurality of types computing devices that may be coupled to the network 112 via the access point 101. The clients may comprise, for example, a processor-based system such as a computer system and/or mobile device. Such computer system may be embodied in the form of a desktop computer, a laptop computer, a personal digital assistant, a cellular telephone, a smartphone, set-top box, music players, web pads, tablet computer systems, game consoles, optical disc players, or any other devices with like capability. The clients can be configured with wireless capability that enables communication with the access point 101. The clients may also implement any of the various IEEE 802.11 standards that facilitate wireless communications.

The proximity server 103 may comprise, for example, a server computer or any other system providing computing capability. Alternatively, a plurality of proximity servers 103 may be employed that are arranged, for example, in one or more server banks or computer banks or other arrangements. For example, a plurality of proximity servers 103 together may comprise a cloud computing resource, a grid computing resource, and/or any other distributed computing arrangement. Such proximity servers 103 may be located in a single installation or may be distributed among many different geographical locations. For purposes of convenience, the proximity server 103 is referred to herein in the singular. Even though the proximity server 103 is referred to in the singular, it is understood that a plurality of proximity server 103 may be employed in the various arrangements as described above. The components executed on the proximity server 103, for example, include proximity management application 106 and other applications, services, processes, systems, engines, or functionality not discussed in detail herein. The proximity management application 106 is configured to maintain location data associated with the various wireless devices 113 that are in communication with the wireless access point 101.

The data stored in the data store 109 includes data accessed by the components executing on the proximity server 103. The data store 109 includes, for example, one or more device 130 entries corresponding to various wireless devices for which the data store 109 can maintain location data. Each device 130 entry can include a device identifier 133, which can represent a MAC address of a wireless device 113, a hash value or key value based upon the MAC address, or any other identifying information that uniquely identifies a wireless device 113. Additionally, each device 130 entry also includes a location 135 that specifies a location of a wireless device 113 in terms of an identity of a wireless access point 101 with which the wireless device 113 is communicating or in proximity. The location 135 can also include a geographic location derived from an identity of the wireless access point 101. It should be appreciated that although the data store 109 is depicted within the proximity server 103, the data store 109 can be implemented in a separate computing device that is accessible to the proximity management application 106 via a network and that the illustration of FIG. 1 is shown for ease of depiction.

Accordingly, a wireless access point 101 and/or proximity server 103 according to an embodiment of the disclosure can allow location of a wireless device 113, or proximity of a wireless device 113 to a wireless access point 101 whose location is known, can be detected.

The location of a wireless device 113, such as a smartphone, laptop computer, or any device with 802.11 capabilities, can be detected by employing a feature of 802.11 networks that does not require modification of the wireless device 113 or its wireless subsystems. A wireless device, according to the various 802.11 standards, when its 802.11 wireless subsystems are activated, generates and broadcasts a probe request frame in order to discover the wireless networks that are within range and that are facilitated by one or more wireless access points 101. This probe request frame, as defined by the various 802.11 standards, generally includes identifying information associated with the wireless device 113 that is transmitting the probe request frame.

Accordingly, the proximity application 105 can obtain a probe request frame from a wireless device 113 when the wireless device 113 is within communication range and extract identifying information from the probe request frame. In some embodiments, this identifying information embedded in the probe request frame includes a MAC address associated with the wireless device 113 or its wireless network adapter, which is generally a globally unique identifier. The identifying information associated with the wireless device 113 can then be transmitted by the proximity application 105 to the proximity management application 106, which can create and/or update a device 130 entry is associated with an identifier 133 corresponding to the identifying information. The device 130 entry can be updated with a location 135 that is associated with the wireless access point 101.

In some embodiments, the location 135 can be derived from an access point identifier that identifies the wireless access point 101 from wireless device 113 identifying information is received. For example, the proximity server 103 can refer to a data structure that indexes wireless access points 101 by a MAC address corresponding to the access point and the physical location of the wireless access point 101 to determine the location 135 in the device entry 130. In other embodiments, the location 135 in the device entry can comprise an access point identifier like the MAC address, and the proximity management application 106 can refer to such a data structure to determine and/or verify the location of the wireless access point 101.

The proximity application 105 can capture and extract identifying information associated with a wireless device 113 regardless of whether the access point system 102 generates a probe response frame in response to a probe request frame received from a wireless device 113. In this way, even if the wireless access point 101 is in a private mode such that it is not discoverable by wireless devices 113 that broadcast probe request frames, the proximity application 105 can still track wireless devices 113 that are in the proximity of the wireless access point 101 and forward identifying information corresponding to the wireless device 113 to the proximity management application 106.

Additionally, the device 130 entry can also be associated with a user account to facilitate various types of applications that make use of information that a wireless device 113 is in a particular location that is in proximity to a wireless access point 101 whose location is known or ascertainable. For example, the proximity management application 106 can deliver marketing messaging to a user of the wireless device 113 in the event that user contact information can be determined from the identifying information (e.g., MAC address) provided by the proximity application 105. In one embodiment, a user may register a wireless device 113 and create a user account that includes an email address, telephone contact information, or any other identifying information, which can be associated with the MAC address of the wireless device 113 of the user.

Accordingly, the proximity management application 106 can send a marketing email, text message, or other form of communication to the user when it has detected that the wireless device 113 associated with the user is in proximity of a particular wireless access point 101. For example, if one or more wireless access points 101 providing identifying information of devices within proximity of access points are positioned within a retail establishment, the proximity management application 106 can send marketing or other types of information to the wireless device 113 when the device is in proximity of the retail establishment. As another example, the proximity management application 106 can also facilitate delivery of personalized communication to devices that are not associated with the user but that are within proximity of the location of the wireless access point 101 when the wireless device 113 is detected in a location. For example, the proximity management application 106 can transmit personalized marketing message or other types of information to the wireless access point 101 and/or a computing device that is coupled to a display device, which can display personalized marketing information to the user.

In another embodiment, the proximity management application 106 can also facilitate secure access control that provides secure access to a facility or other type of resource where it may be useful to verify the physical location of a user requesting access to the resource. For example, an access control system that provides secure access to a door or other type of physical barrier that is operated by radio frequency identification (RFID) cards, near field communication (NFC) tags, or even biometric authentication can request that the proximity management application 106 verify the location of the user based upon the detected location of the wireless device 113 that is associated with a user account of the user. In this scenario, if a user provides a user credential such as an RFID enabled access card, the access control system can also query the proximity management application 106 to determine whether a wireless device 113 associated with the user is also in the proximity of a wireless access point 101 within a proximity threshold of a resource to which the user is requesting access.

The identifying information about a wireless device 113 provided by the proximity application 105 to the proximity management application 106 can also include a timestamp. Therefore, in the case of an access control system facilitated by the proximity management application 106, the proximity management application 106 can also verify whether the wireless device 113 associated with the user requesting access to a resource via an access control system is within proximity of a particular location within a particular period of time.

As noted above, many wireless access points 101 that are potentially disparately located can be configured to provide identifying information about a wireless device 113 in response to an 802.11 probe request frame received from the wireless device 113. Accordingly, in some scenarios, the proximity management application 106 may receive identifying information or notifications that a particular wireless device 113 associated with a particular MAC address is within proximity of more than one wireless access point 101. Accordingly, in a first scenario, because the location of the wireless access points 101 is known or ascertainable, the proximity management application 106 can determine whether the multiple notifications from different wireless access points 101 including a particular wireless device's 113 identifying information are received within a threshold span of time. If the wireless access points 101 are within a threshold radius of one another, then the proximity management application 106 may be able to calculate or determine a more refined location 135 associated with the device 130 entry.

In another scenario, two or more of the wireless access points 101 from which the multiple notifications are received may not be in close proximity to one another. In this scenario, the proximity management application 106 can detect a potential MAC address spoofing attempt associated with a wireless device 113 if notifications from wireless access points 101 that are located more than a threshold distance apart from one another are received with the same identifying information for the wireless device 113 within a threshold amount of time. For example, if wireless access points 101 that are located thousands of miles apart transmit identifying information indicating that a wireless device 113 associated with a particular MAC address is in proximity of both access points, the proximity management application 106 can detect a potential MAC address spoofing attempt. Therefore, in one example, the proximity management application 106 can deny confirmation of the location of a user associated with the wireless device 113.

Reference is now made to FIGS. 2-5, which illustrate various non-limiting examples of how the proximity application 105 (FIG. 1) executed by the wireless access point 101 as well as the proximity management application 106 executed by the proximity server 103 can detect a location of a wireless device. In the data flow diagram of FIG. 2, when a wireless device 113 within communication range of a the wireless access point 101 issues a probe request frame 201 obtained by the wireless access point 101, the proximity application 105 extracts identifying information from the probe request frame 201 (e.g., a MAC address or other device identifier), and forwards the identifying information 203 to the proximity management application 106 on the proximity server 103. In one embodiment, the proximity application 105 also includes an access point identifier so that the proximity management application 106 can determine the location of the wireless device 113 from a known location of the wireless access point 101 in a data structure indexed by the access point identifier that includes its location.

Figure 2:
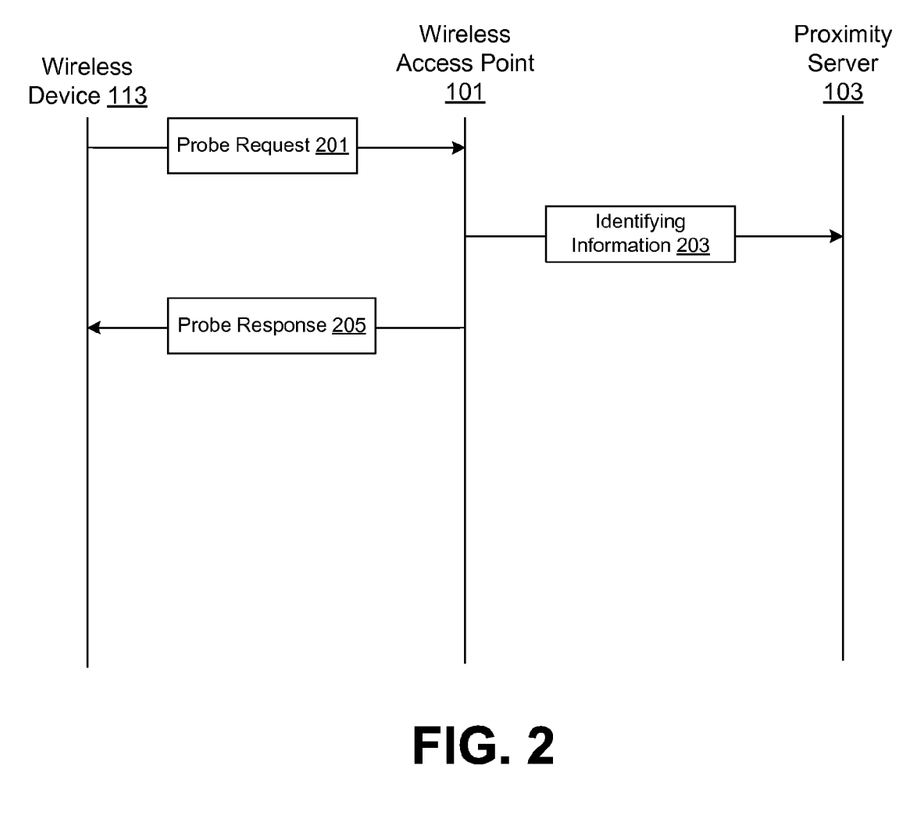
FIGS. 2-5 are data flow diagrams illustrating examples of data exchanged between the proximity application, proximity management application, and wireless devices according to various embodiments of the disclosure.

The wireless access point 101 can optionally issue a probe response frame 205 and include the requested parameters and other information needed by the wireless device 113 to attempt to join a network facilitated by the wireless access point 101. However, as noted above, issuing a probe response frame 205 is not a requirement for the proximity application 105 to obtain a probe request frame 201 from the wireless device 113 and transmit identifying information 203 about the wireless device 113 to the proximity management application 106.

Figure 3:
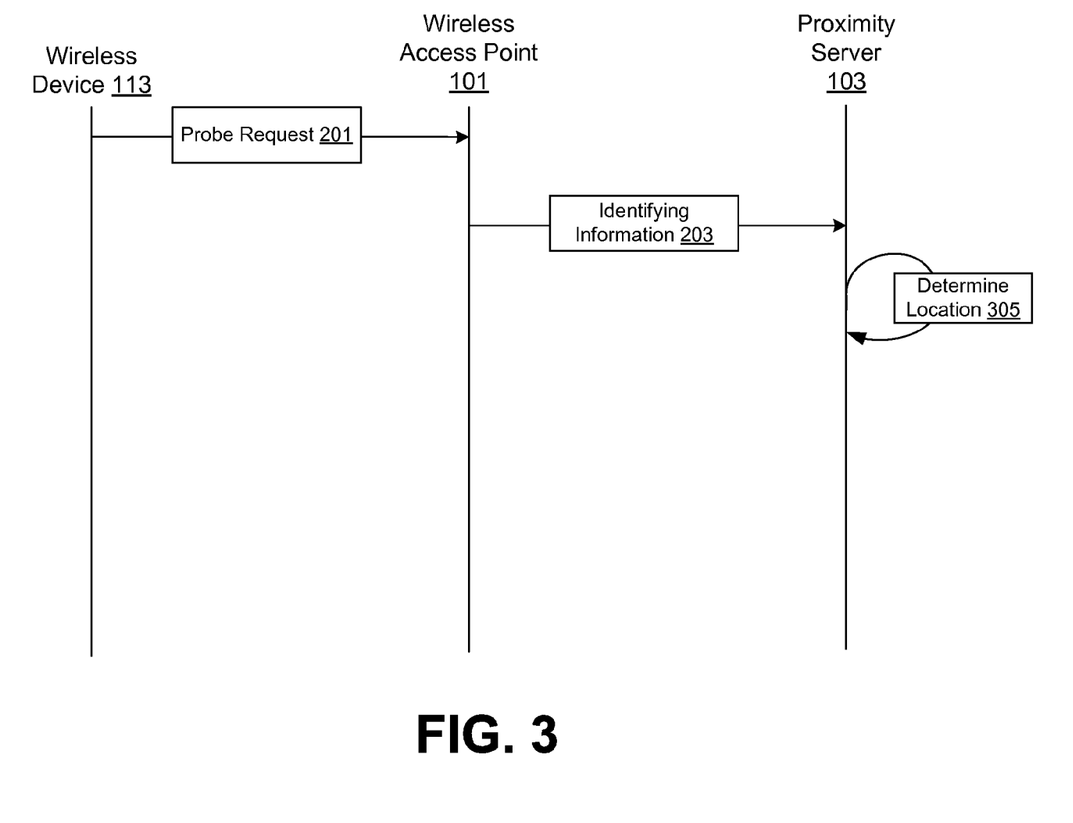

Accordingly, as shown in FIG. 3, the wireless access point 101 receives a probe request frame 201 from a wireless device 113 as described above. Accordingly, the proximity management application 106, upon receiving identifying information 203 associated with the wireless device 113 and/or wireless access point 101 from the proximity application 105, can determine a location (305) of the wireless device 113 based upon the identifying information 203. For example, the identifying information 203 transmitted by the proximity application 105 can include a MAC address of the wireless access point 101. Therefore, if the location of the wireless access point 101 is known, the proximity management application 106 can determine that the wireless device 113 is in proximity to the wireless access point 101 and update a corresponding device 130 entry. As an additional example, the identifying information 203 generated by the proximity application 105 and transmitted to the proximity management application 106 can include location information with which the device 130 entry can be updated.

Figure 4:
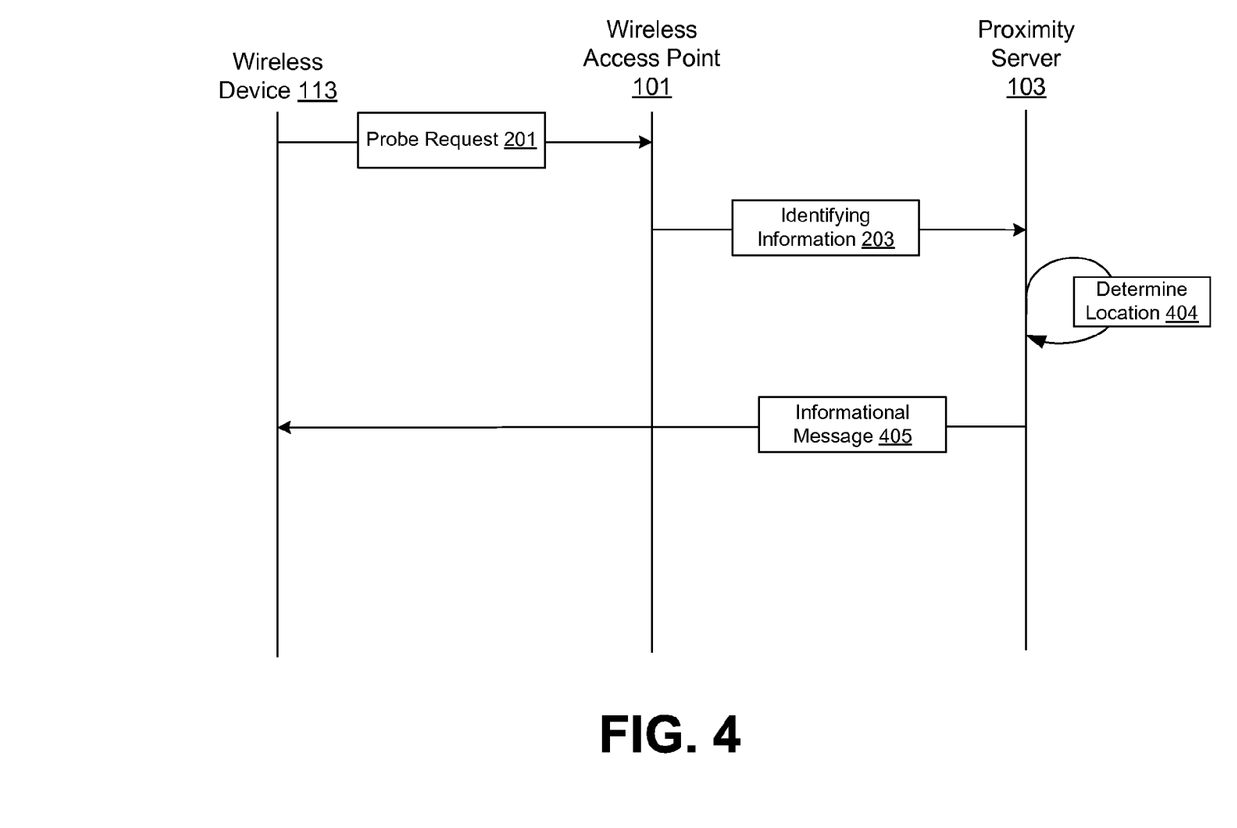

Referring next to FIG. 4, the wireless access point 101 again receives a probe request frame 201 from a wireless device 113 as described above. Accordingly, the proximity management application 106, upon receiving identifying information 203 associated with the wireless device 113 and/or wireless access point 101 from the proximity application 105, can determine a location (404) of the wireless device 113 based upon the identifying information 203. For example, the identifying information 203 transmitted by the proximity application 105 can include a MAC address of the wireless access point 101. Therefore, if the locating of the wireless access point 101 is known, the proximity management application 106 can determine that the wireless device 113 is in proximity to the wireless point 101 and update a corresponding device 130 entry. As an additional example, the identifying information 203 generated by the proximity application 105 and transmitted to the proximity management application 106 can include location information with which the device 130 entry can be updated.

Additionally, shown in FIG. 4 is an example of data flow in the case of the proximity management application 106 facilitating transmission of one or more informational messages 405, such as a promotional message or any other type of message or information to the wireless device 113 when the location of the wireless device 113 is detected. In the depicted example, the proximity management application 105 can, for example, transmit informational messages 405 to the wireless device 113. In some embodiments, the content of an informational message 405 or other type of information can be generated and transmitted by another system, and it should be appreciated that in the depicted data flow diagram, the informational message 405 is shown as originating from the proximity server 103 for ease of depiction.

Figure 5:
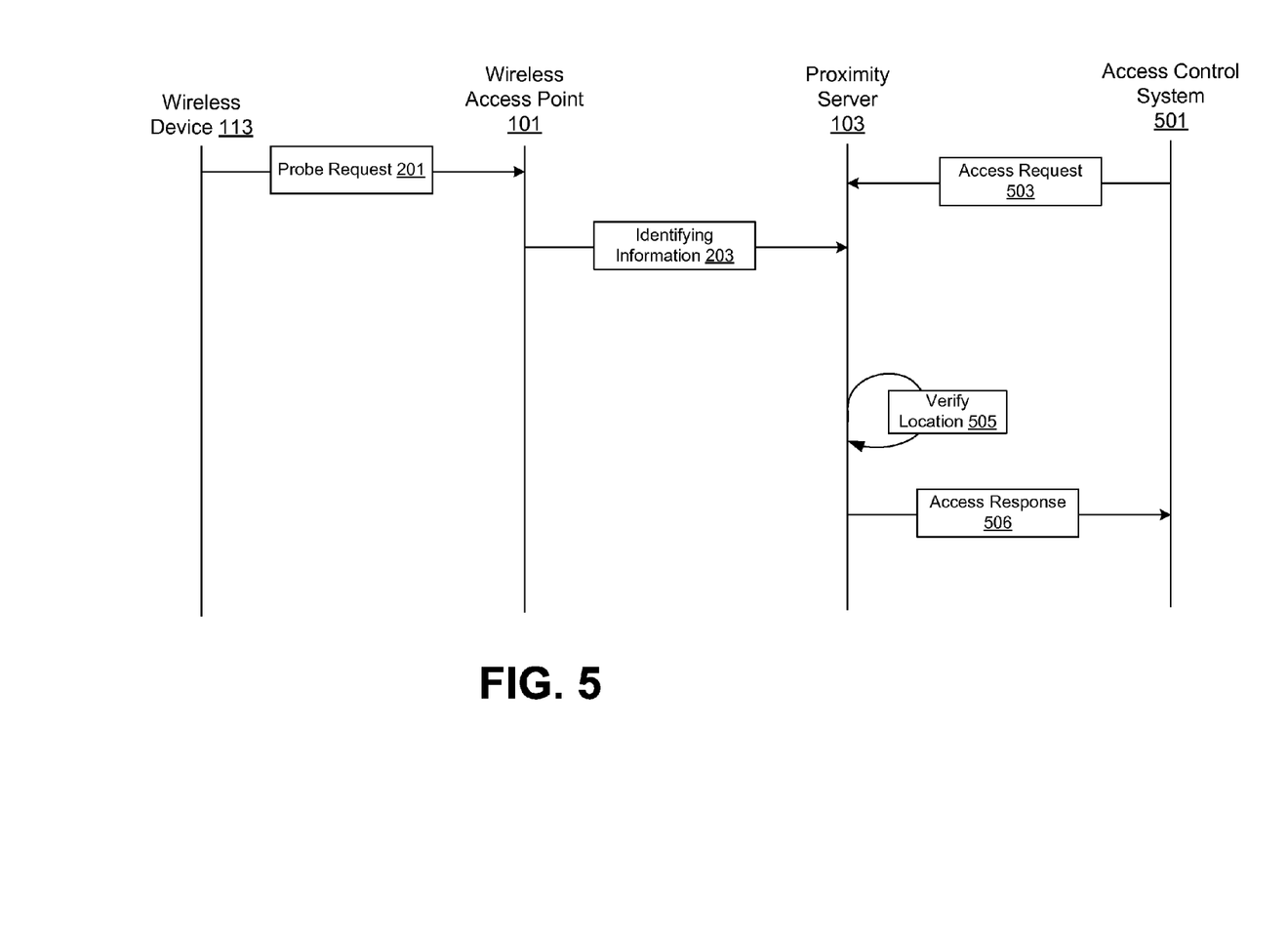

Referring to FIG. 5, shown is an example of the proximity application 105 (FIG. 1) and proximity management application 106 (FIG. 1) facilitating access control or security applications. In the depicted example, as discussed above, the proximity management application 106 can obtain identifying information 203 associated with a wireless device 113 in proximity to an access point 101 when the wireless access point 101 receives a probe request frame 201 from a wireless device 113. Additionally, an access control system 501 can submit an access request 503 associated with an attempt by a user to access a resource (e.g., door, facility, or any other resource). The access request 503 includes some identifier associated with the user attempting to access the resource. Accordingly, the proximity management application 106, in response to receiving the access request 503, can determine whether a wireless device 113 that may also associated with a user account of the user, is within proximity of a specified wireless access point 101 or any wireless access point 101 that is within a proximity radius of the secured resource the user is attempting to access (505). Upon verifying the location of the wireless device 113, the proximity management application 106 can issue an access response 506 indicating that whether or not the wireless device 113 associated with the user is in proximity of the wireless access point 101. The access control system 501 can then grant or deny access to the user based upon the response from the proximity management application 106.

Figure 6:
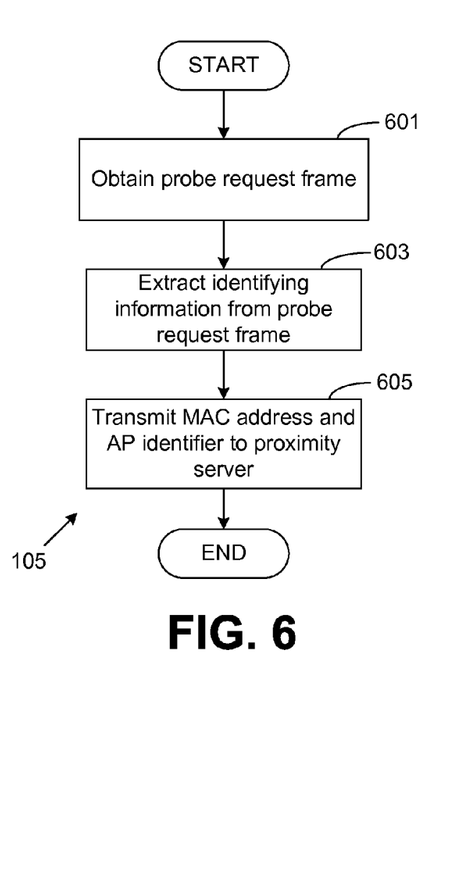
FIGS. 6-7 are flowcharts illustrating non-limiting examples of functionality implemented as portions of the proximity application executed in a wireless access point and proximity management application executed in proximity server, respectively, in the networked environment of FIG. 1 according to various embodiments of the present disclosure

Referring next to FIG. 6, shown is a flowchart that provides one example of the operation of a portion of the proximity application 105 (FIG. 1) that can be executed in the wireless access point 101 (FIG. 1) according to various embodiments. It is understood that the flowchart of FIG. 6 provides merely an example of the many different types of functional arrangements that may be employed to implement the operation of the portion of the proximity application 105 as described herein. As an alternative, the flowchart of FIG. 6 may be viewed as depicting an example of steps of a method implemented in the wireless access point 101 according to one or more embodiments.

First, the proximity application 105 obtains an 802.11 probe request frame from a wireless device 113 that is within communication range of the wireless access point 101 (601). Next, the proximity application 105 can extract a MAC address or other identifying information associated with the wireless device 113 from the probe request frame (603). The proximity application 105 can then transmit to the proximity management application 106 the MAC address or other identifying information as well as information from which the wireless access point 101 can be identified, such as the MAC address associated with the wireless access point or any other type of identifier. In another embodiment, location data of the wireless access point 101 (e.g., location data from a GPS system, etc.) can be transmitted to the proximity management application 106 or identified from a data store 109 containing location information about various wireless access points 101 (605).

Figure 7:
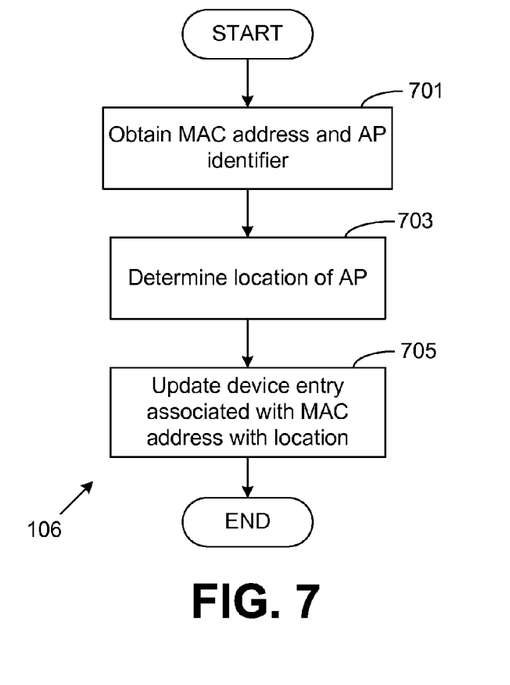

Referring next to FIG. 7, shown is a flowchart that provides one example of the operation of a portion of the proximity management application 106 (FIG. 1) that can be executed in the proximity server 103 (FIG. 1) according to various embodiments. It is understood that the flowchart of FIG. 7 provides merely an example of the many different types of functional arrangements that may be employed to implement the operation of the portion of the proximity management application 106 as described herein. As an alternative, the flowchart of FIG. 7 may be viewed as depicting an example of steps of a method implemented in the proximity server 103 according to one or more embodiments.

First, in box 701, the proximity management application 106 obtains the MAC address (or other data identifying the wireless device 113) as well as access point identifying information, such as a MAC address, from the wireless access point 101. In box 703, the proximity management application 106 identifies a location of the wireless access point 101. The location can be identified by location information provided by the wireless access point 101 to the proximity management application 106. In some embodiments, the location can be identified by location information about the wireless access point 101 that is maintained by the proximity management application 106.

The proximity management application 106 then creates and/or updates a device 130 entry associated with the received MAC address with information from which the location of the wireless device 113 can be ascertained (705). The proximity management application 106 can also detect a potential MAC address spoofing attempt associated with a wireless device 113 if notifications are received from wireless access points 101 that correspond to a location that is more than a threshold distance apart from one another and with the same identifying information for the wireless device 113 within a threshold amount of time. For example, if wireless access points 101 that are located thousands of miles apart transmit identifying information indicating that a wireless device 113 associated with a particular MAC address is in proximity of both access points, the proximity management application 106 can detect a potential MAC address spoofing attempt. Therefore, in one example, the proximity management application 106 can deny confirmation of the location of a user associated with the wireless device 113 and forgo updating the device 130 entry associated with the received MAC address in such a scenario.

Figure 8:
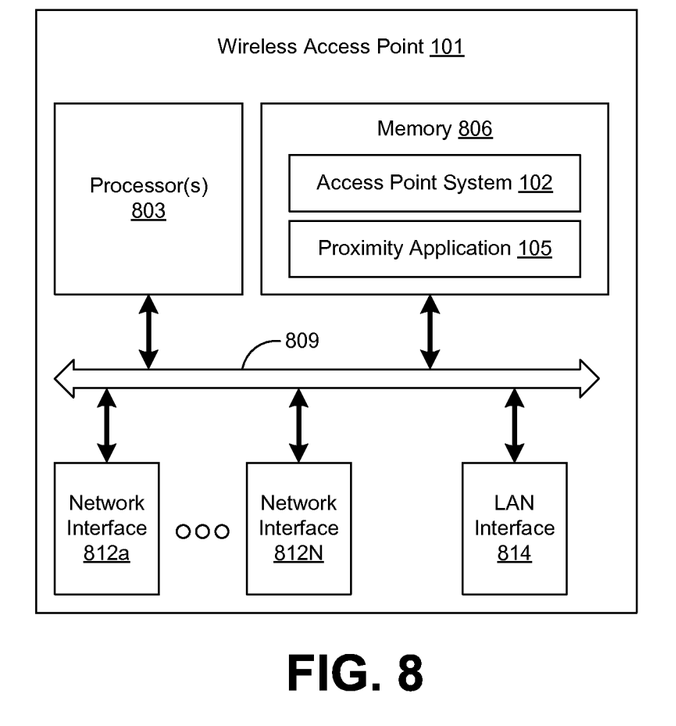
FIG. 8 is a schematic block diagram that provides one example illustration of a wireless access point employed in the networked environment of FIG. 1 according to various embodiments of the present disclosure.

FIG. 8 illustrates one example of a schematic block diagram of a wireless access point 101 according to an embodiment of the present disclosure. The wireless access point 101 includes at least one processor circuit, for example, having a processor 803 and a memory 806, both of which are coupled to a local interface 809. To this end, the wireless access point 101 may comprise, for example, an embedded computing device, a router, a switch, and/or any other device that may be coupled to a network 112 (FIG. 1). The local interface 809 may comprise, for example, one or more data buses with an accompanying address/control bus or other bus structure as can be appreciated. Also coupled to the local interface 809 may be one or more wireless network interfaces 812a . . . 812N and a local area network (LAN) interface 814. The LAN interface 814 is used to connect the wireless access point 101 to the network 112 (FIG. 1).

Stored in the memory 806 are both data and several components that are executable by the processor 803. In particular, stored in the memory 806 and executable by the processor 803 are the access point system 102, proximity application 105, and potentially other applications. It is understood that there may be other applications that are stored in the memory 806 and are executable by the processor 803 as can be appreciated. Where any component discussed herein is implemented in the form of software or firmware, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software or firmware components can be stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806 or between any two of the memories 806, etc. The local interface 809 may comprise additional systems designed to coordinate this communication, including, for example, performing load balancing. The proximity server 103 may also be implemented in a computing device as shown in FIG. 8, or in any other general purpose computing system.

Although the access point system 102, proximity application 105, proximity management application 106, and various other systems described herein may be embodied in software, firmware, or code executed by general purpose hardware as discussed above, as an alternative the same may also be embodied in dedicated hardware such as digital logic circuitry, or a combination of software, firmware, and/or general purpose hardware and dedicated hardware. If embodied in dedicated hardware, each can be implemented as circuitry or a state machine that employs any one of or a combination of a number of technologies. These technologies may include, but are not limited to, discrete logic circuits having logic gates for implementing various logic functions upon an application of one or more data signals, application specific integrated circuitry having appropriate logic gates, or other components, etc. Such technologies are generally well known by those skilled in the art and, consequently, are not described in detail herein.

The flowcharts of FIGS. 6-7 data flow diagrams of FIGS. 2-5 show the functionality and operation of an implementation of one example of the proximity application 105 and proximity management application 106, respectively. If embodied in software or firmware, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6-7 data flow diagrams of FIGS. 2-5 show a specific order of execution or occurrence, it is understood that the order of execution or occurrence may differ from that which is depicted. For example, the order of execution of two or more blocks may be scrambled relative to the order shown. Also, two or more blocks shown in succession in FIGS. 6-7 data flow diagrams of FIGS. 2-5 may be executed or occur concurrently or with partial concurrence. Further, in some embodiments, one or more of the blocks shown in FIGS. 6-7 data flow diagrams of FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the access point system 102, proximity application 105, proximity management application 106 or any other data or processes discussed herein, that comprises software or firmware can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system, comprising:
a wireless access point comprising at least one circuit or processor configured to:
obtain a probe request from a wireless device, the probe request received from the wireless device for information about available wireless networks and not including an access point identifier corresponding to the wireless access point;
extract identifying information corresponding to the wireless device from the request;
originate a message, which is not a probe response and not a message received from the wireless device and includes the access point identifier corresponding to the wireless access point and the identifying information; and
transmit the message including the identifying information and the access point identifier to at least one server, which is configured to determine a location of the wireless device based on a stored location corresponding to the access point identifier.

2. The system of claim 1, wherein the probe request from the wireless device comprises an 802.11 probe request frame including the identifying information.

3. The system of claim 2, wherein the identifying information comprises a media access control (MAC) address associated with the wireless device that is embedded in a frame header of the probe request frame.

4. The system of claim 1, wherein the access point identifier comprises at least one of a MAC address associated with the wireless access point or a location of the wireless access point.

5. The system of claim 1, wherein the identifying information further comprises a timestamp.

6. The system of claim 1, wherein the at least one server comprises:
at least one server circuit or server processor configured to:
store an entry in a data store corresponding to the identifying information, the entry comprising the identifying information and the location of the wireless access point.

7. The system of claim 6, wherein the at least one server circuit or server processor is further configured to associate the entry in the data store with a user account.

8. The system of claim 7, wherein the at least one server circuit or server processor is further configured to:
obtain a request to access a resource associated with the user account;
determine whether the location associated with the entry corresponds to a location associated with the resource; and
generate an alert when the location associated with the entry and the location associated with the resource fail to correspond.

9. The system of claim 7, wherein the at least one server circuit or server processor is further configured to:
generate at least one informational message relevant to the user account and the location; and
transmit the at least one informational message to the wireless device via the network and the wireless network associated with the wireless access point.

10. The system of claim 7, wherein the at least one server circuit or server processor is further configured to:
generate at least one promotional message relevant to the user account and the location; and
transmit the at least one promotional message to the wireless access point via the network, wherein the at least one circuit or processor is configured to cause the at least one promotional message to be displayed on a display device associated with the location.

11. The system of claim 7, wherein the at least one server circuit or server processor is further configured to:
determine whether a second entry associating the identifying information with a second access point identifier has been stored in the data store within a predetermined threshold amount of time;
identify a potential MAC address spoofing attempt when the location is outside a predetermined radius of a second location associated with the second access point identifier; and
refine the location associated with the entry when the second location is within the predetermined radius.

12. A method, comprising:
obtaining a probe request from a wireless device in a wireless access point, the probe request comprising an 802.11 probe request frame and not including an access point identifier corresponding to the wireless access point;
extracting, in the wireless access point, identifying information corresponding to the wireless device from the 802.11 probe request frame;
originating a message, which is not a probe response and not a message received from the wireless device and includes the access point identifier corresponding to the wireless access point and the identifying information; and
transmitting, from the wireless access point, the message including the identifying information and the access point identifier to at least one server, which is configured to determine a location of the wireless device based on a stored location corresponding to the access point identifier.

13. The method of claim 12, wherein the identifying information comprises a media access control (MAC) address associated with the wireless device, and the access point identifier comprises at least one of a MAC address associated with the wireless access point or a location of the wireless access point.

14. The method of claim 12, wherein the identifying information further comprises a timestamp.

15. The method of claim 12, further comprising:
storing, in the at least one server, an entry corresponding to the identifying information, the entry comprising the identifying information and the location of the wireless access point.

16. The method of claim 15, further comprising:
associating the entry with a user account.

17. The method of claim 16, further comprising:
obtaining, in the at least one server, a request to access a resource associated with the user account;
determining, in the at least one server, whether the location associated with the entry corresponds to a location associated with the resource; and
generating, in the at least one server, an alert when the location associated with the entry and the location associated with the resource fail to correspond within a predetermined threshold amount of time from a timestamp.

18. The method of claim 16, further comprising transmitting, from the at least one server, at least one promotional message relevant to the user account and the location to the wireless device via the network and the wireless network associated with the wireless access point.

19. The method of claim 14, further comprising:
determining, in the at least one server, whether a second entry associating the identifying information with a second access point identifier has been stored within a predetermined threshold amount of time;
identifying, in the at least one server, a potential MAC address spoofing attempt when a location is outside a predetermined radius of a second location associated with the second access point identifier; and
refining, in the at least one server, the location associated with an entry when the second location is within the predetermined radius.

20. A system, comprising:
means for obtaining a probe request from a wireless device in a wireless access point, the request comprising an 802.11 probe request frame and not including an access point identifier corresponding to the wireless access point;
means for extracting a MAC address associated with the wireless device from the 802.11 probe request frame;
means for originating a message, which is not a probe response and not a message received from the wireless device and includes the access point identifier corresponding to the wireless access point and the identifying information; and
means for transmitting the message including the MAC address associated with the wireless device and the access point identifier corresponding to the wireless access point to at least one server, which is configured to determine a location of the wireless device based on a stored location corresponding to the access point identifier.

* * * * *